(12) United States Patent
Zhuang et al.

(10) Patent No.: US 7,809,757 B2
(45) Date of Patent: Oct. 5, 2010

(54) XML BASED OBJECT-RELATIONSHIP MAPPING FOR DIFFERENT OBJECT TYPE

(75) Inventors: Yi Zhuang, Markham (CA); Xi Y. Zhou, Beijing (CN); Bin Zhou, Beijing (CN); Lev Mirlas, Thornhill (CA); Zhi L. Dong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 11/842,241

(22) Filed: Aug. 21, 2007

(65) Prior Publication Data

US 2009/0055424 A1 Feb. 26, 2009

(51) Int. Cl.
- G06F 7/00 (2006.01)
- G06F 17/00 (2006.01)
- G06F 17/30 (2006.01)

(52) U.S. Cl. .................. 707/795; 707/602; 707/809; 707/917

(58) Field of Classification Search .................. 707/1–5, 707/10, 102, 999.001–5, 999.01, 999.1, 795, 707/999.102
See application file for complete search history.

(56) References Cited

U.S. PATENT DOCUMENTS

| | | | | |
|---|---|---|---|---|
| 2002/0128734 | A1* | 9/2002 | Dorsett, Jr. ...................... | 700/1 |
| 2005/0257193 | A1* | 11/2005 | Falk et al. .................... | 717/109 |
| 2005/0278270 | A1* | 12/2005 | Carr et al. ...................... | 706/25 |
| 2006/0004750 | A1* | 1/2006 | Huang et al. .................... | 707/6 |
| 2007/0058041 | A1* | 3/2007 | Arseneau et al. ............ | 348/157 |
| 2008/0137688 | A1* | 6/2008 | Walsh .......................... | 370/498 |

OTHER PUBLICATIONS (6.0.0.2) Creating a new extended term and condition type for contracts and accounts, http://publib.boulder.ibm.com/infocenter/wchelp/v6r0m0/topic/tc-customization/tasks/tctcreate.htm, release date: Apr. 20, 2007, 5 pages.

* cited by examiner

*Primary Examiner*—Mohammad Ali
*Assistant Examiner*—Kannan Shanmugasundaram
(74) *Attorney, Agent, or Firm*—Cantor Colburn LLP; Libby Toub

(57) ABSTRACT

A method for XML based object-relationship mapping for different object types in a computer system is provided. The method includes creating a database schema in a database layer including a single table with specific database columns for storing known properties as well as customizable database columns for storing extended properties. The method also includes creating an object in an object layer that has specific methods for known properties and dynamic methods for extended properties, where the object types are variations of the object, the object includes fields for the properties, and the object supports reading and writing the properties to corresponding database columns in the table. The method further includes creating an XML file containing definitions for new object types and new properties, where the property definitions include database column names, and the XML file contains display information for GUI management. The method additionally includes outputting display information a GUI.

5 Claims, 2 Drawing Sheets

XML BASED OBJECT-RELATIONSHIP MAPPING FOR DIFFERENT OBJECT TYPE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computer system data management, and particularly to eXtensible Markup Language (XML) based object-relationship mapping for different object types.

2. Description of Background

Enterprise applications often employ numerous software objects that can benefit from inheritance relationships but must also support persistent data storage for future use (e.g., e-business applications). In developing and modeling relationships between multiple similar objects, the task of creating inheritance relationships between the objects while supporting persistent data storage can result in a number of issues. Although multiple models have been developed to establish relationships between objects with inheritance and data storage schemas, existing models may not provide both rapid data search performance and ease of modification to add new properties and object types. It would be beneficial to develop a method to model relationships between object types that supports extensibility for rapid updates and reconfiguration, while also providing fast data searching performance for the underlying persistent data.

For example, an object type of "employee" can have an inheritance relationship with both a "regular employee" and a "contractor employee" object types, where regular employee and contractor employee object types have additional properties that are not common between them. While this type of inheritance relationship is common, difficulties can arise in determining how to organize the object data structure relationship and the underlying database schema such that the addition of new properties to either object type (e.g., regular employee and/or contractor employee) has a minimal impact on existing object structures and the database schema. One approach is to create an inheritance structure of objects, with different objects for each object type, and employ multiple database tables, with one table per object type. However, this approach is very difficult to customize, as the addition of a new property requires a database schema change, as well as code changes and regeneration to create the changed object type. Moreover, this approach is inefficient for searching, as multiple tables must be traversed and may require a join operation. Multiple tables also consume more database resources. A second approach is to create an inheritance structure of objects, with different objects for each object type, and employ a single database table with columns for all properties in the full inheritance structure. While such an approach may improve search performance over the first approach, adding new properties or object types still creates problems, as the code creating the objects must be changed to regenerate the updates. A third approach is to employ a single object and a vertical database schema. Using this approach may improve the ability to extend and customize the data structure, but it results in poor search performance, as multiple tables must be traversed in a hierarchical manner. Accordingly, there is a need in the art for a method to perform object-relationship mapping for different object types that supports both extensibility and rapid searching of the underlying persistent data.

SUMMARY OF THE INVENTION

The shortcomings of the prior art are overcome and additional advantages are provided through the provision of a method for extensible Markup Language (XML) based object-relationship mapping for different object types in a computer system. The method includes creating a database schema in a database layer including a single table with specific database columns for storing known properties as well as customizable database columns for storing extended properties. The method also includes creating an object in an object layer that has specific methods for known properties and dynamic methods for extended properties, where the object types are variations of the object, the object includes fields for the properties, and the object supports reading and writing the properties to corresponding database columns in the table. The method further includes creating an XML file containing definitions for new object types and new properties, where the property definitions include database column names, and the XML file contains display information for graphical user interface (GUI) management. The method additionally includes outputting display information associated with the object types and the properties to a GUI.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECT

As a result of the summarized invention, technically we have achieved a solution that uses an XML file as a hub to map object properties for multiple object types to a database table in a manner that is extensible without object code updates or database schema changes. Additional technical effects include the ability to update an associated graphical user interface for changes in object properties through the XML file, as well as rapid searching due to a single data table implementation for multiple object types.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments, as shown and described by the various figures and the accompanying text, provide methods, systems and computer program products for eXtensible Markup Language (XML) based object-relationship mapping for different object types in a computer system. In exemplary embodiments, an XML file is used as a hub to connect an object layer to a database layer, providing an extensible architecture for a high degree of flexibility while also supporting rapid searches of persistent data. The object layer may include an object with dynamic methods, and the database layer may employ a table with custom columns. In exemplary embodiments, the XML file not only contains the definition of object types and associated properties, but it also defines the mapping between the properties and corresponding database columns. Through the inventive principles disclosed herein, a solution is provided that combines the advantages of both simple extensibility and rapid search performance. Adding new object types or new properties can be achieved via an update of the XML file without any code or database schema changes. Since object properties are stored in a single table in specific columns rather than a vertical schema or across multiple tables, high performance searching can be realized. Furthermore, additional content can be added to the XML file to support greater functionality. For example, display information for a graphical user interface (GUI) can be included in the XML file, enabling automatic support for new object types and new properties at both a data structure level as well as a user interface level.

Figure 1:
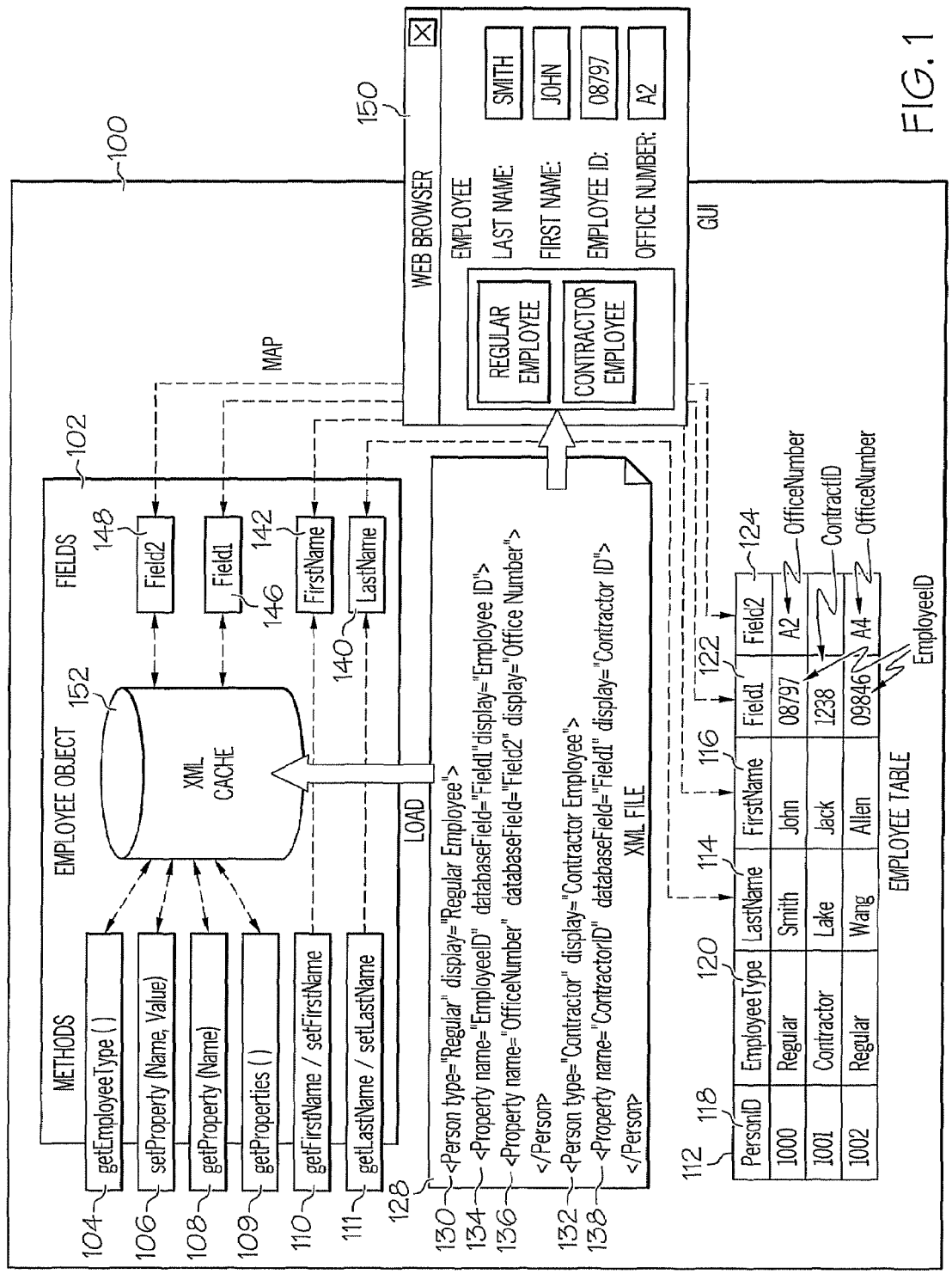
FIG. 1 depicts one example of XML based object-relationship mapping for different object types in a computer system.

Turning now to the drawings in greater detail, it will be seen that in FIG. 1 there is an exemplary XML based object-relationship mapping for different object types in a computer system 100. The computer system 100 is high-speed processing device (e.g., a mainframe computer) including at least one processing circuit (e.g., a CPU, not depicted) capable of reading and executing instructions, and producing output. In the example depicted in FIG. 1, a single generic object 102 represents all object types in an object layer (e.g., employee object for regular employee and contractor employee object types). In exemplary embodiments, the object 102 is an Enterprise Java Bean™ (EJB), which is a server-side component for modular construction of enterprise applications. The object 102 may include a method to support requests to get the object type (e.g., getEmployeeType method 104). The object 102 may further include specific methods for getting and setting known properties (getFirstName/setFirstName 110, getLastName/setLastName 111). The object 102 may also include a variety of dynamic methods that accept property names as parameters so that they can handle extended properties (properties that are unknown at design time but may be added in the future) without the need to add new methods. These dynamic methods can perform requests such as: set a property (e.g., setProperty method 106), get a property (e.g., getProperty method 108), get all properties (e.g., getProperties method 109), and the like.

A database table 112 is used to store all object types and their associated properties in a database layer. An identifier column (e.g., PersonID 118) is used to uniquely identify specific records in the table 112 as a primary key. An object type column (e.g., EmployeeType 120) is used to identify the type of object represented by each record. The table 112 may include specific columns for known properties, such as LastName 114 and FirstName 116, which may also be referred to as database columns. The table 112 also defines customizable database columns (e.g., Field1 122, Field2 124, and so on.) for storing extended properties, which can be added later on. According to specific design considerations, the customizable database columns can use different data types such as string, integer, and timestamp. Thus, as new object types are created, the database schema can remain fixed and data associated with a new object type can be added as a new row in the table 112. As extended properties are added, customizable columns (e.g., Field1 122, Field2 124) can be populated without modifying the database schema.

In exemplary embodiments, an XML file 128 acts as a hub connecting the object 102 of the object layer together with the table 112 of the database layer. The XML file 128 holds the definitions of all object types that are extensions of the object 102. For example, the XML file 128 includes object type names 130 and 132 (e.g., "Regular", "Contractor") and extended property definitions 134, 136, and 138 contained in each object type (e.g., "EmployeeID" and "OfficeNumber" properties of "Regular" object type). Each extended property definition 134-138 may also include more information about the property, such as the data type of the property.

The XML file 128 establishes the mapping between extended properties of the object 102 and corresponding columns in the table 112. While prior art mapping is typically performed using hard coded direct mapping between properties and database columns, the XML file 128 of FIG. 1 acts as a hub for flexible mapping between the extended properties and the database columns, which are used for storing these properties. In exemplary embodiments, Container-Managed Persistence (CMP) fields of the Entity EJB object 102 (e.g., LastName 140, FirstName 142, Field1 146, Field2 148) are linked to the database columns of table 112 (e.g., LastName 114, FirstName 116, Field1 122, Field2 124. The extended properties of object types are mapped to database fields/columns through the property definitions held in the XML file 128 (e.g., property definitions 134-138). For example, in the XML file 128, property "EmployeeID" of "Regular" type is mapped to "Field1", and property "contractorID" of "Contractor" type is also mapped "Field1". Thus, a common table field/column can be assigned different definitions depending upon the object type. Although the XML file 128 of FIG. 1 depicts a limited number of properties and object types, it will be understood that any number of new object types and new properties can be included in the XML file 128 in addition to other information. In alternate exemplary embodiments, the XML file 128 includes extended property definitions which are unknown at design time but may be added in the future (e.g., property definitions 134-138 mapping to "Field1" and/or "Field2"). Known properties in object type variations can be directly linked to corresponding database fields/columns without a definition in the XML file 128 (e.g., LastName 140 and FirstName 142 are directly linked to LastName 114 and FirstName 116).

The XML file 128 may also include information for a GUI to manage and display object types and their properties, such as GUI 150. For example, a display name for an object type or a property can be defined within the XML file 128 for display through the GUI 150 (e.g., display labels for object types 130 and 132 and in property definitions 134-138). In exemplary embodiments, the GUI 150 can be output locally to the computer system 100 or transmitted to other remote user systems for display (not depicted). To support multiple languages on the GUI 150, display names, as well as other properties, can be defined in separate property files (not depicted) with the XML file 128 defining pointers to the property files. This allows the GUI 150 to automatically support new object types and new properties without the any changes.

To improve runtime performance, upon system initialization, the XML file 128 may be loaded into XML cache 152. In exemplary embodiments, using the XML cache 152 provides a faster response time to access the contents of the XML file 128 as compared to accessing the XML file 128 from a secondary storage medium such as a hard disk device (not depicted).

The inventive principles disclosed herein may be applied to numerous applications. For example, the use of an XML file as a hub for object-relationship mapping for different object types can be employed in IBM's WebSphere® Commerce to customize and extend terms and conditions of contracts. Through modifying an appropriate XML file, extensions and customization can be achieved without modifying object code or a database schema. Reloading XML cache, such as the XML cache 152, can enable new properties and/or object types to be incorporated and made available within the computer system 100 at runtime without the need to restart the computer system 100. Other applications using an XML file as a hub for object-relationship mapping for different object types will be apparent to those skilled in the art and are included within the scope of this disclosure.

Figure 2:
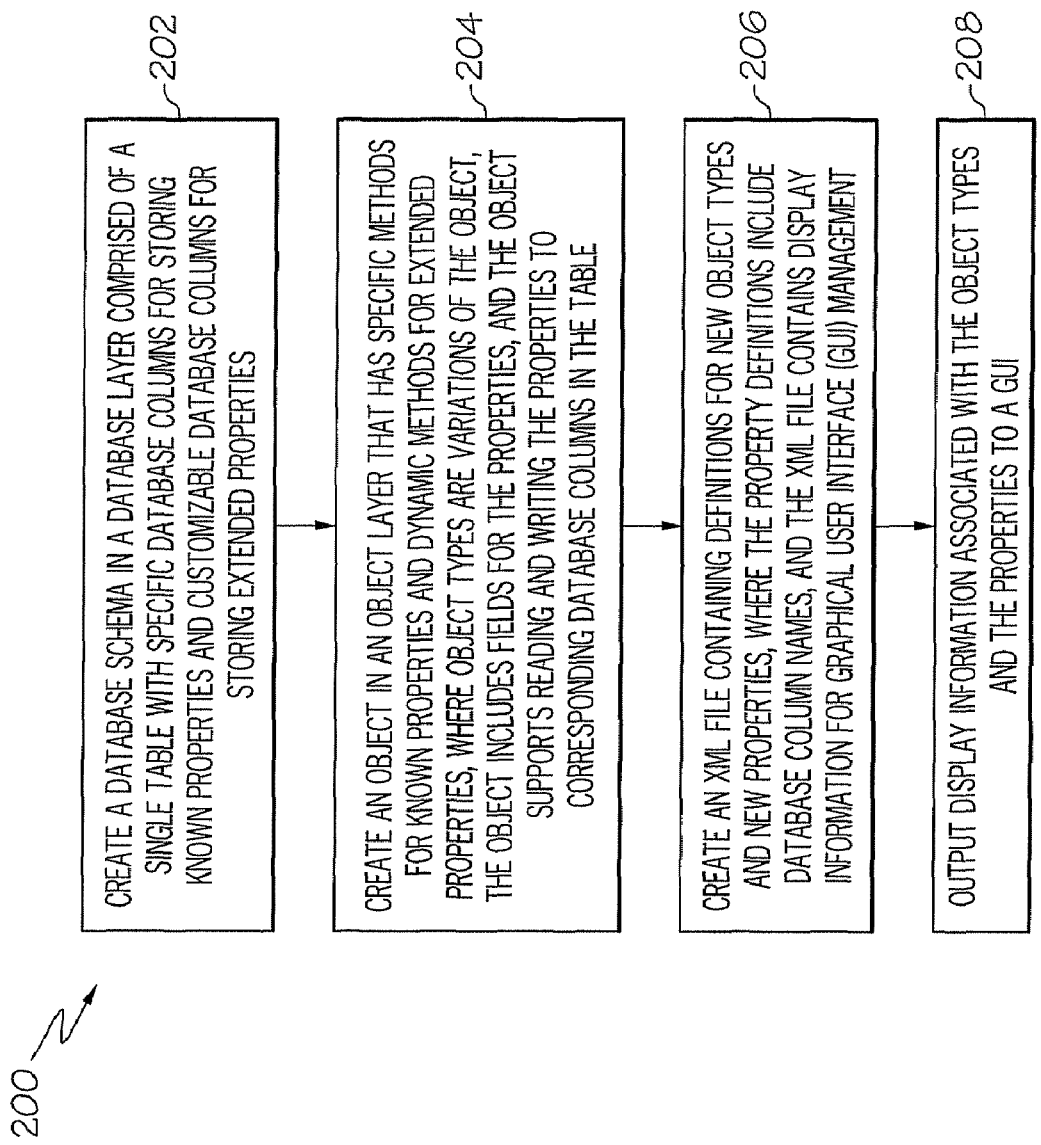
FIG. 2 depicts a process for XML based object-relationship mapping for different object types in exemplary embodiments.

Turning now to FIG. 2, a process 200 for XML based object-relationship mapping for different object types will now be described in accordance with exemplary embodiments, and in reference to the computer system 100 of FIG. 1. A user can perform the process 200 interactively through the computer system 100 of FIG. 1. At block 202, a database schema in a database layer is created including a single table, such as table 112 of FIG. 1, with specific database columns for known properties. The table includes at least one customizable database column to support one or more extended properties beyond an initial definition of an object to which it maps.

At block 204, an object is created in an object layer that supports numerous object types and properties, such as object 102 of FIG. 1. In exemplary embodiments, the object types are variations of the object, and the object includes fields for known properties, which map to the specific database columns in the table. The object also includes customizable fields, which map to the customizable database columns to support extension beyond the initial definition of the object. The object includes specific methods for getting and setting known properties. The object also includes dynamic methods for getting or setting extended properties. In exemplary embodiments, the object supports reading and writing the properties to corresponding database columns in the table using object methods. For example, a call to the setProperty method 106 of object 102 with a parameter of "LastName" updates the corresponding database column LastName 114 in the table 112 of FIG. 1.

At block 206, an XML file (such as XML file 128 of FIG. 1) is created which initially may be empty. In the future, when a need arises to add new object types or add new properties to existing object types, the definition of the new object types and new properties can simply be added to the XML file, as well as the mapping from the new properties to the database columns. The XML file may also include one or more pointers to property files that provide support for multiple languages for display via a GUI, such as GUI 150 of FIG. 1. There is no need to change the object or the database schema. Upon computer system initialization or command, the contents of the XML file can be loaded into an XML cache, such as the XML cache 152 of FIG. 1. The computer system 100 of FIG. 1 may use the XML cache to establish the mapping between the object and the table to increase processing and search speed.

At block 208, display information associated with the object and the table as mapped through the XML file is output to a GUI, such as the GUI 150 of FIG. 1. The computer system 100 of FIG. 1 can generate output for local display or send the output to a remote user system.

Advantages of exemplary embodiments include ease of extension, dynamic extension, rapid search performance, and automatic GUI support, among others. Ease of extension means that new object types or new properties can be supported without any code or database schema changes. All that need be done is to update the XML file. Dynamic extension refers to the ability to add new object types and new properties dynamically, without the need to restart the computer system 100. Dynamic extension can be achieved through issuing a command to reload the contents of the XML file 128 to the XML cache 152. Rapid search performance can be achieved since all properties are stored in specific database columns in one table, thus preventing overhead penalties associated with traversing multiple tables to search for data. After adding new object types or properties, the XML file 128 allows the GUI 150 to support the new object types and properties without additional changes.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for eXtensible Markup Language (XML) based object-relationship mapping for different object types in a computer system, comprising:

creating a database schema in a database layer comprised of a single table with specific database columns for storing known properties as well as customizable database columns for storing extended properties, wherein a common column of the customizable database columns is assigned different definitions depending upon mapping of the object types to the common column between different rows of the table, and wherein at least one of the customizable database columns supports one or more extended object properties beyond an initial definition of the object;

creating an object in an object layer that has specific methods for the known properties, a method to support requests to determine the object types, and dynamic methods for the extended properties, wherein the object types are variations of the object, the object includes fields for the known and extended properties, and the object supports reading and writing the known and extended properties to corresponding database columns in the table;

creating an XML file as a hub to connect the database layer and the object layer, the XML file comprising definitions of all object types that are extensions of the object, the mapping of the object types to the common column of the customizable database columns, and definitions for new object types and new properties, wherein the property definitions include database column names, and the XML file further comprises display information for graphical user interface (GUI) management;

loading the contents of the XML file into an XML cache;

reloading the XML cache to enable the new object types and the new properties at runtime without a restart of the computer system; and outputting display information associated with the object types and the properties to a GUI, wherein the XML file includes one or more pointers to property files, the property files providing support for multiple languages for the GUI, such that the GUI automatically supports the new object types and the new properties at runtime and without changes to the GUI that require the restart of the computer system.

2. The method of claim 1 further comprising:
using the XML cache to establish a mapping between the object and the table.

3. The method of claim 2 further comprising:
loading the contents of the XML file into an XML cache upon a command or initialization of the computer system.

4. The method of claim 1 wherein the object is an Enterprise Java Bean (EJB) object.

5. The method of claim 1 wherein the new object types or the new properties are added through updating the XML file without changing code used to generate the object or modifying the database schema.

* * * * *